(12) United States Patent
Chadha et al.

(10) Patent No.: US 12,244,792 B2
(45) Date of Patent: Mar. 4, 2025

(54) PROCESSING IMAGE DATA

(71) Applicant: Sony Interactive Entertainment Europe Limited, London (GB)

(72) Inventors: Aaron Chadha, London (GB); Ioannis Andreopoulos, London (GB)

(73) Assignee: Sony Interactive Entertainment Europe Limited, London (GB)

( * ) Notice: Subject to any disclaimer, the term of this patent is extended or adjusted under 35 U.S.C. 154(b) by 809 days.

(21) Appl. No.: 17/349,831

(22) Filed: Jun. 16, 2021

(65) Prior Publication Data
US 2022/0321879 A1 Oct. 6, 2022

(30) Foreign Application Priority Data
Mar. 30, 2021 (GR) ............... 20210100210

(51) Int. Cl.
*H04N 19/107* (2014.01)
*H04N 19/124* (2014.01)
*H04N 19/42* (2014.01)
*H04N 19/85* (2014.01)

(52) U.S. Cl.
CPC ......... *H04N 19/107* (2014.11); *H04N 19/124* (2014.11); *H04N 19/42* (2014.11); *H04N 19/85* (2014.11)

(58) Field of Classification Search
CPC .... H04N 19/147; H04N 19/42; H04N 19/124; H04N 19/85; H04N 19/103; H04N 19/107
See application file for complete search history.

(56) References Cited

U.S. PATENT DOCUMENTS

| | | | | |
|---|---|---|---|---|
| 2019/0340509 A1* | 11/2019 | Osindero | ............... | G06N 3/092 |
| 2021/0329267 A1* | 10/2021 | Kianfar | ............... | H04N 19/48 |
| 2022/0030246 A1* | 1/2022 | Xu | ............... | G06N 3/047 |
| 2022/0201316 A1* | 6/2022 | Coelho | ............... | H04N 19/96 |
| 2023/0298570 A1* | 9/2023 | Wang | ............... | G10L 15/16 |
| | | | | 704/232 |

OTHER PUBLICATIONS

Extended European Search Report for European Patent Application No. 21180010.7, dated Dec. 16, 2021, 12 pages.

(Continued)

*Primary Examiner* — Charles N Appiah
(74) *Attorney, Agent, or Firm* — Dinsmore & Shohl LLP

(57) ABSTRACT

A method of processing, prior to encoding using an external encoder, image data using an artificial neural network is provided. The external encoder is operable in a plurality of encoding modes. At the neural network, image data representing one or more images is received. The image data is processed using the neural network to generate output data indicative of an encoding mode selected from the plurality of encoding modes of the external encoder. The neural network trained to select using image data an encoding mode of the plurality of encoding modes of the external encoder using one or more differentiable functions configured to emulate an encoding process. The generated output data is outputted from the neural network to the external encoder to enable the external encoder to encode the image data using the selected encoding mode.

19 Claims, 12 Drawing Sheets

(56) References Cited

OTHER PUBLICATIONS

Liu Zhenyu et al: "CU Partition Mode Decision for HEVC Hardwired Intra Encoder Using Convolution Neural Network", IEEE Transactions On Image Processing, IEEE, USA, vol. 25, No. 11, Nov. 1, 2016 (Nov. 1, 2016 ), pp. 5088-5103.

Shen Liquan et al: "SHVC CU Processing Aided by a Feedforward Neural Network", IEEE Transactions On Industrial Informatics, IEEE Service Center, New York, NY, US, vol. 15, No. 11, Nov. 1, 2019 (Nov. 1, 2019), pp. 5803-5815.

Siwei Ma et al: "Image and Video Compression With Neural Networks: A Review", Apr. 10, 2019 (Apr. 10, 2019), pp. 1-16.

* cited by examiner

Intra prediction modes:

Transform and quantization parameters:
$\mathbf{H}, L, N, Q, A(Q), B(Q), f$

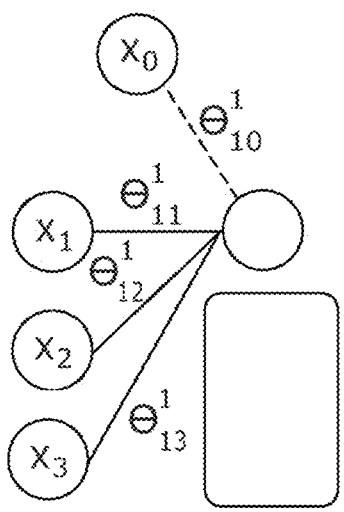

$$g(\Theta_{10}^1 x_0 + \Theta_{11}^1 x_1 + \Theta_{12}^1 x_2 + \Theta_{13}^1 x_3)$$

$\Theta_{13}^1$ means:

1 (superscript) - mapping from layer 1
1 - mapping to node 1 in layer 2 (L+1)
3 - mapping from node 3 in layer 1 (L)

Figure 6(a)

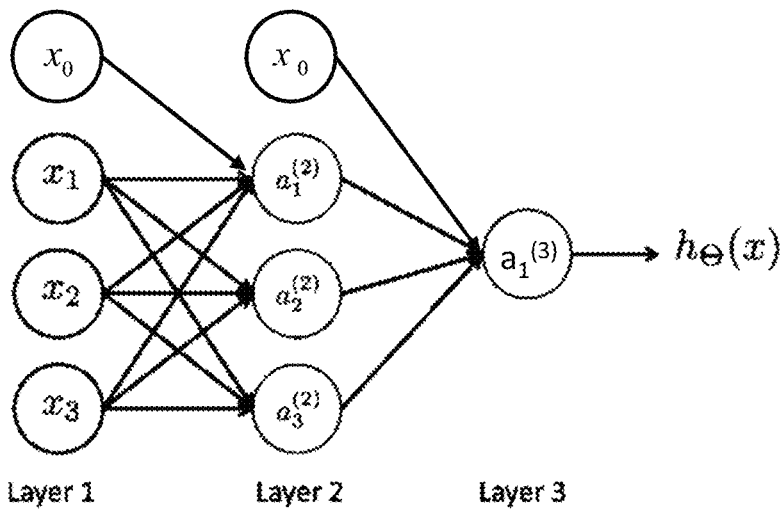

$$a_1^{(2)} = g(\Theta_{10}^{(1)} x_0 + \Theta_{11}^{(1)} x_1 + \Theta_{12}^{(1)} x_2 + \Theta_{13}^{(1)} x_3)$$
$$a_2^{(2)} = g(\Theta_{20}^{(1)} x_0 + \Theta_{21}^{(1)} x_1 + \Theta_{22}^{(1)} x_2 + \Theta_{23}^{(1)} x_3)$$
$$a_3^{(2)} = g(\Theta_{30}^{(1)} x_0 + \Theta_{31}^{(1)} x_1 + \Theta_{32}^{(1)} x_2 + \Theta_{33}^{(1)} x_3)$$
$$h_\Theta(x) = a_1^{(3)} = g(\Theta_{10}^{(2)} a_0^{(2)} + \Theta_{11}^{(2)} a_1^{(2)} + \Theta_{12}^{(2)} a_2^{(2)} + \Theta_{13}^{(2)} a_3^{(2)})$$

Figure 6(b)

PROCESSING IMAGE DATA

TECHNICAL FIELD

The present disclosure concerns computer-implemented methods of processing image data prior to encoding with an external encoder. The disclosure is particularly, but not exclusively, applicable where the image data is video data.

BACKGROUND

When an image or video coding standard has been set, the normative specification of the standard describes in an unambiguous manner the format of the bitstream that an encoder must produce, and the decoding and signal reconstruction operations a decoder must be able to carry out, in order to be compliant with the standard. Aspects of the encoder design may be left open to modification, as long as the final produced bitstream is compliant with the standard.

In order to achieve compliance with a given image or video coding standard, the encoding modes of the encoder (also referred to herein as 'decision modes') must be compliant with the standard specification. Such encoding modes control the predetermined set of tools or operations used by the encoder to analyze, predict and quantize input signals. For example, multi-frame motion vectors, intra prediction modes, switching modes that signal the switch between inter- and intra-prediction within block-based motion estimation and compensation form some such encoding modes in video coding standards like H.264/AVC. Within such standards, blocks in the current frame of an input video signal may be intra-predicted, e.g. predicted based on signal values from within the current frame, or inter-predicted, e.g. predicted based on signal values from previous frames. Within each coding standard specification, there is a list of predetermined encoding modes that can be used for such intra- and/or inter-prediction, as well as transform, quantization and entropy coding. However, the standard specification does not specify algorithms or methods to select these encoding modes and this is left open to innovation from various encoder designers that propose and implement encoding methods to convert input video to a series of standard-compliant encoding modes, and eventually to a standard-compliant bitstream.

A signal encoded using different encoding modes (e.g. prediction modes) may have different rate and/or distortion properties. In order to optimize such rate-distortion properties, known encoders may include functionality to compare possible encoding modes and select an encoding mode to use for encoding a given signal (e.g. a given block of image data). This allows the encoder to convert input video frames into predicted signals and quantize and encode the residual information such that the required rate and the reconstructed signal distortion are both minimized. The process of selecting which encoding mode to use to encode each section of a given signal (e.g. a given block of image data) may be carried out by a bespoke or hand-crafted algorithm, which may be implemented in, or separately from, the encoder. However, comparing the various available encoding modes during operation of the encoder may be computationally expensive and/or inefficient. This is because, for example, there may be a relatively large number of options to select from.

Practical designs tend to make certain simplified assumptions about convexity of rate-distortion curves and additivity of distortion in order to derive practical implementations. This leads to the encoding mode selection itself being performed by a hand-crafted algorithm, which may be tied to a particular encoder and/or coding standard, and which may be relatively inflexible and/or require substantial effort to change or optimize further.

Other known methods change the existing prediction or quantization modes of a standard encoder and attempt to generate new modes that may be more efficient than the existing ones. However, such methods change the way the encoded bitstream is produced, thereby requiring bespoke encoders and decoders that are no longer standard-compliant. That is, by modifying the existing encoding modes and creating bespoke bitstream formats, bespoke transport mechanisms and/or bespoke decoders in client devices are also required.

The present disclosure seeks to solve or mitigate some or all of these above-mentioned problems. Alternatively and/or additionally, aspects of the present disclosure seek to provide improved methods of processing image data, and in particular methods that can be used in combination with existing image and video codec frameworks.

SUMMARY

In accordance with a first aspect of the present disclosure, there is provided a computer-implemented method of processing, prior to encoding using an external encoder, image data using an artificial neural network, wherein the external encoder is operable in a plurality of encoding modes. The method comprises receiving, at the neural network, image data representing one or more images. The method also comprises processing the image data using the neural network to generate output data indicative of an encoding mode selected from the plurality of encoding modes of the external encoder. The neural network is trained to select using image data an encoding mode of the plurality of encoding modes of the external encoder using one or more differentiable functions configured to emulate an encoding process. The method further comprises outputting the generated output data from the neural network to the external encoder to enable the external encoder to encode the image data using the selected encoding mode.

By selecting encoding modes from image data (also referred to herein as 'pixel data') using the trained neural network, the rate-distortion properties of the final encoded image data are optimized in an intelligent and flexible manner. This improves the efficiency of the encoding process, and/or the visual quality of decoded and reconstructed images, whilst maintaining compliance with a given image or video coding standard.

In particular, by mapping image data to standard-compliant encoding modes using a trained neural network, the external encoder can produce the final bitstream in a fully standard-compliant manner. As such, despite the use of the neural network to derive the encoding modes, the external encoder itself remains standard-compliant. This ensures that bitstream packaging, transport, decoding and display can occur without change, and that bespoke bitstream formats, bespoke transport mechanisms and/or bespoke decoders in client devices are not required. Indeed, the described methods do not operate at the decoder side and do not require any changes at the decoding or post-decoding stages.

Using a neural network as described herein to select encoding modes for use by the external encoder enables the external encoder (e.g. a standard-compliant encoder) to operate more efficiently. This is because the neural network can be trained to explore and select from a very large mode selection space based on representative input data and with a bespoke set of loss functions representing bitrate and reconstruction quality estimates. Once its chosen encoding modes are produced, this significantly reduces the number of encoding modes that need to be considered by the external encoder. Further, by designing, training and deploying a bespoke artificial neural network architecture that learns to map input pixels of image or video sequences into encoding modes that comply with a given image or video encoding standard, hand-crafted code is no longer required to derive such encoding modes within a given image or video encoder. Such hand-crafted code is replaced with a more flexible and/or versatile neural network-based design that directly maps input pixels to encoding mode decisions. The remaining encoding operations, e.g. the lossless encoding of encoding modes and prediction error residuals, as well as the reconstruction at the encoder (for closed-loop prediction), remains compliant to the standard, as do all operations at the decoder.

Further, by using a neural network trained using differentiable functions that emulate (or approximate) an encoding process, the neural network can be trained in an end-to-end manner using back-propagation learning and stochastic gradient descent. For example, the set of encoding modes of the external encoder and/or their effects in the input signal can be approximated using differentiable functions. In addition, rate and/or quality loss functions associated with the decoded and reconstructed pixel representations generated using the encoding modes can also be defined and/or approximated using differentiable functions. This allows the set of regularized rate-quality losses to be minimized, by back-propagating through an approximated (or 'virtualized') encoder and training the neural network in an end-to-end manner. In this way, the neural network (which is trained to map input pixel data to encoding mode decisions) is an end-to-end pixel-to-decision-mode mapping engine, which is fully learnable and does not involve any hand-crafted mode selection.

In embodiments, the external encoder comprises an image codec. In embodiments, the image data comprises video data and the one or more images comprise frames of video. In embodiments, the external encoder comprises a video codec. The methods of processing image data described herein may be performed on a batch of video data, e.g. a complete video file for a movie or the like, or on a stream of video data. In embodiments, the image data represents a portion of an image, e.g. a block or sub-region of an image.

Examples of image or video coding standards that can be used with the disclosed neural network include, but are not limited to, JPEG, JPEG2000, AVC/H.264, HEVC/H.265, VVC/H.266, AOMedia VP9, AV1, AV2, etc. It will be understood that the disclosed methods can be applied to any image or video coding standard, however, including current and future standards. Further, the neural network described herein can be trained to select encoding modes corresponding to multiple different standards, thereby enabling compatibility with multiple different external encoders. The disclosed methods can be applied to multiple current and future standards by providing the lists of encoding modes associated with such standards (and optionally approximated with differentiable functions) in the manner described below.

In embodiments, a single encoding mode is selected from the plurality of encoding modes of the external encoder. In alternative embodiments, multiple encoding modes are selected and outputted to the external encoder. Regardless of whether a single encoding mode or multiple encoding modes are selected, the encoding mode search space is reduced for the external encoder, thereby allowing the external encoder to operate in a more efficient manner.

The neural network as described herein may be referred to as a 'preprocessing network', in that it acts prior to processing the image data using the external encoder. It will be understood that the processing of image data using the neural network does not involve the external encoder itself. That is, the neural network methods described herein are independent of the external encoder. Instead, the entire neural network operation during deployment of the neural network occurs prior to any encoding by the external encoder. For training of the neural network, the external encoder is not required and need not be present. Instead, differentiable functions configured to emulate or approximate an encoding process are used in the training of the neural network. In some examples, such functions include one or more differentiable rate loss functions which estimate a rate that would be required by an external encoder to encode data, but which do not actually utilize the external encoder itself. As such, the configuration of the neural network can be performed independently of the (or any other) external encoder, and the neural network is not tied to any particular external encoder, but may be compatible with multiple different external encoders.

In embodiments, the plurality of encoding modes of the external encoder comprises a plurality of prediction modes for encoding image data using predictive coding, the plurality of prediction modes relating to intra-prediction and/or inter-prediction. Each of intra-prediction and inter-prediction may comprise one or more prediction modes, for example. In embodiments, the plurality of prediction modes comprises a plurality of block sizes and/or a plurality of intra-prediction directions.

In embodiments, one or more of the plurality of encoding modes of the external encoder comprises a plurality of quantization parameters useable by the external encoder to encode the image data. Examples of such quantization parameters include, but are not limited to, a quantization step size, a quantization function, a quantizer dead zone size, a quantization level, etc. In embodiments, the plurality of encoding modes comprises both prediction modes and quantization parameters. In alternative embodiments, the plurality of encoding modes comprises only prediction modes or only quantization parameters. The plurality of encoding modes may comprise other encoding parameters and/or settings in alternative embodiments. For example, the plurality of encoding modes may comprise one or more deblocking filtering modes designed to remove the visibility of blocking artefacts, as well as reconstruction modes useable to reconstruct image data, e.g. a reconstruction function or a dynamic range of reconstruction. The plurality of encoding modes may comprise one or more frequency transform modes useable to transform residual data, according to some embodiments.

In embodiments, the plurality of encoding modes are associated with an image and/or video coding standard. The plurality of encoding modes of the external encoder are useable by the external encoder in order for the external encoder to comply with a given standard. In embodiments, the plurality of encoding modes are specified by the standard. As such, the plurality of encoding modes comprise predefined encoding modes allowable by the standard. In embodiments, the plurality of encoding modes are required to be available for use by the external encoder in order for the encoder to generate a standard-compliant bitstream.

In embodiments, each of the plurality of encoding modes of the external encoder generates an encoded bitstream having a format that is compliant with an image and/or video coding standard. That is, if the external encoder uses one of the plurality of encoding modes then a standard-compliant bitstream will be produced, whereas if the external encoder does not use one of the plurality of encoding modes then the format of the resulting bitstream might not comply with the standard.

In embodiments, the neural network is configured to select the encoding mode from the plurality of encoding modes based on image content of the received image data. As such, the neural network is configured to map input pixel data to encoding mode decisions for encoding that pixel data. This is in contrast to some known methods which select an encoding mode for a given image (or image region) not based on image content, but on the encoding mode used for other images (or image regions).

In embodiments, the neural network is trained using one or more differentiable functions configured to emulate operations associated with the plurality of encoding modes. This allows the neural network to compare encoding modes and determine optimal encoding modes without using the external encoder itself, whilst allowing for back-propagation learning of the neural network.

In embodiments, the neural network is trained to optimize a rate score indicative of the bits required by the external encoder to encode the residual information produced by the encoding modes produced by the neural network, as well as the encoding modes themselves. The bits required by the external encoder may be bits-per-pixel or bits-per-second, for example. The utilized process can also generate estimates of the reconstructed pixel representation after reconstructing the input pixels given the neural network's output encoding mode(s) and all relevant information from previously-reconstructed blocks. In embodiments, the rate score is calculated using one or more differentiable functions configured to emulate an encoding process. As such, the rate score may be calculated independently of (and without using) the external encoder. For example, the aforementioned estimates of the reconstructed pixel representation may be generated using differentiable functions that emulate an encoding process, and the output pixel representations are then analyzed to obtain the rate score.

In embodiments, the rate score is calculated using a differentiable rate loss function. In embodiments, the rate loss function is modelled with a set of equations that express the expected rate needed by a standard image or video encoder. In embodiments, during an initial setup or training phase, the rate loss function is minimized via back-propagation and gradient-descent methods and training input data that is used to produce the rate loss function.

In embodiments, the neural network is trained to optimize a quality score indicative of the quality of output pixel representations generated using the encoding modes. The output pixel representations can be generated based on the encoding modes produced by the neural network and differentiable approximations of their corresponding prediction, quantization and other operations such that an approximation of the reconstructed pixels at the decoder side is produced. In embodiments, the quality score is calculated using one or more differentiable functions that are indicative of signal distortion in the output pixel representations, and/or loss of perceptual and/or aesthetic quality in the output pixel representations. In embodiments, during an initial training or setup phase, the quality loss function is minimized via back-propagation and gradient-descent methods and training input data that is used to produce the quality loss function.

Quality scores that can be used by the disclosed methods and system include, but are not limited to, one or more of the following objective, perceptual or aesthetic image quality scores: peak-signal-to-noise ratio (PSNR), structural similarity index metric (SSIM), multiscale quality metrics such as the detail loss metric or multiscale SSIM, metrics based on multiple quality scores and data-driven learning and training, such as the video multi-method assessment fusion (VMAF), or aesthetic quality metrics, and variations of these metrics. The quality scores can be reference or non-reference based, with each quality score being maximized via back-propagation and gradient-descent methods and training input data that is used to produce the quality score.

Rate scores can include, but are not limited to, estimations of the bits-per-pixel (bpp) rate to encode: (i) the residual information produced when applying the derived encoding modes to the input; (ii) the encoding modes themselves. These estimations are carried out via a set of functions that model the expected bpp or bits-per-second (bps) of a standard image or video encoder. In embodiments, combinations of such scores are derived in a way that estimates the bits produced by the entropy encoding utilized by such encoders, with examples being estimations of context-adaptive arithmetic encoding, Huffman encoding, run-length and predictive encoding. The analytic and/or operational models expressing or emulating the expected rate to encode the transformed outputs can be converted into mathematically differentiable functions, which can be trained with back-propagation and gradient descent methods and training data that is representative of the bpp or bps rate of the encoder utilized to compress the transformed pixel representation produced by the disclosed system. The rate score can be minimized by minimizing the bpp or bps rate, which can be done in one of three ways: (i) by directly minimizing the rate score with no constraint; (ii) by minimizing the rate score subject to a global fixed rate constraint over all input data; (iii) by minimizing the distance between the rate score and a reference rate score per input image or video.

In embodiments, one of the quality score and the rate score is fixed during training, and the other of the quality score and the rate score is optimized. In other embodiments, both the quality score and the rate score are optimized. In embodiments, the quality score and/or the rate score are combined with linear or non-linear weights, and the linear or non-linear weights are trained based on back-propagation and gradient descent methods with representative training data. In embodiments, the quality loss function, the rate loss function, and/or the weights of the neural network are trained, and the training is performed at intervals with new measurements as updated by the training.

In embodiments, the reconstructed pixel representations are corrupted by applying one or more differentiable functions and an approximation, wherein the output pixel representations are corrupted so as to approximate (or emulate) the corruption expected from a block-based transform and quantization used in the external encoder, and/or to approximate the corruption expected from a transform and quantization of errors computed from a block-based temporal prediction process used in the external encoder. Corrupting the output pixel representations introduces a loss of fidelity (e.g. blocking artefacts) which emulates fidelity losses introduced from typical encoders used to compress image or video data. This allows the disclosed system to utilize such emulated behavior in its operation and optimization process.

In embodiments, the neural network is trained using one or more regularization coefficients corresponding to a desired rate-quality operational point. The regularization coefficients may be used together with rate and quality loss functions, as described in more detail below. The use of such regularization coefficients allows the neural network to be trained to balance rate and quality in a desired manner.

Advantageously, the neural network comprises an artificial neural network including multiple layers having a convolutional architecture, with each layer being configured to receive the output of one or more previous layers. Such an artificial neural network may comprise a set of interconnected adjustable weights and activation functions. In embodiments, the outputs of each layer of the neural network are passed through a non-linear parametric linear rectifier function, pReLU. Other non-linear functions may be used in other embodiments.

In embodiments, the method further comprises determining one or more loss functions based on the generated output data and adjusting the neural network using back-propagation of the value of the one or more loss functions. The one or more loss functions may relate to quality and/or rate associated with output and/or reconstructed pixel representations generated using the encoding modes, for example. Adjusting the neural network may comprise adjusting the weights and/or activation functions of the neural network, thereby optimizing the performance of the neural network. As such, training of the neural network may be performed not only during an initial training phase, but may be repeated online during deployment, in order to adjust to specific content or encoding devices, or fine-tune the already established weights and/or activation functions.

In embodiments, back-propagation learning uses learning rules that are deterministic or stochastic (e.g. done after averaging over batches of arbitrarily sampled inputs/outputs). Gradients can be computed on single inputs, on batches of inputs or, on the whole training dataset, per training iteration. The learning parameters, such as the initial learning rate and learning rate decay, can be empirically tuned to optimize speed of training and performance. Batches of training data can be selected in a deterministic or random/pseudo-random manner.

In embodiments, the method comprises preprocessing the image data prior to processing the image data using the neural network. Preprocessing the image data may comprise prefiltering the image data. Such preprocessing may be performed using an artificial neural network. Preprocessing (e.g. prefiltering) the input image data allows the encoding mode selection to be optimized according to end-to-end back-propagation learning that incorporates the decoder-side reconstruction operation.

In embodiments, the method further comprises, at the external encoder receiving the output encoding mode data from the neural network and encoding the image data using these encoding modes selected in order to generate an encoded bitstream. In embodiments, the encoded bitstream has a format that is compliant with a given image or video coding standard (e.g. the same standard that is associated with the plurality of encoding modes).

In accordance with a second aspect of the present disclosure, there is provided a computer-implemented method of configuring an artificial neural network for processing image data prior to encoding using an external encoder. The external encoder is operable in a plurality of encoding modes. The artificial neural network comprises a set of interconnected adjustable weights and being arranged to select using image data an encoding mode of the plurality of encoding modes of the external encoder using one or more differentiable functions configured to emulate an encoding process. The method comprises receiving, at the neural network, image data representing one or more images. The method also comprises processing the image data using the neural network to generate output data indicative of an encoding mode of the plurality of encoding modes. The method further comprises determining one or more loss functions based on the generated output data and adjusting the weights of the artificial neural network based on back-propagation of values of the one or more loss functions.

In embodiments, the method comprises reconstructing image data indicative of decoder-side reconstructed image data derivable based on receiving an encoding mode of the plurality of encoding modes. In such embodiments, the one or more loss functions are determined based on the reconstructed image data.

In accordance with another aspect of the disclosure, there is provided a computing device that comprises a memory comprising computer-executable instructions and a processor configured to execute the computer-executable instructions and cause the computing device to perform a method of processing, prior to encoding using an external encoder, image data using an artificial neural network. The external encoder is operable in a plurality of encoding modes. The method comprises receiving, at the artificial neural network, image data representing one or more images. The method further comprises processing the image data using the artificial neural network to generate output data indicative of an encoding mode selected from the plurality of encoding modes of the external encoder. The artificial neural network is trained to select using image data an encoding mode of the plurality of encoding modes of the external encoder using one or more differentiable functions configured to emulate an encoding process. The method also comprises outputting the generated output data from the artificial neural network to the external encoder to enable the external encoder to encode the image data using the selected encoding mode.

In accordance with another aspect of the disclosure, there is provided a non-transitory computer-readable medium comprising computer-executable instructions that, when executed by a processor of a computing device, cause the computing device to perform a method of processing, prior to encoding using an external encoder, image data using an artificial neural network. The external encoder is operable in a plurality of encoding modes. The method comprises receiving, at the artificial neural network, image data representing one or more images. The method further comprises processing the image data using the artificial neural network to generate output data indicative of an encoding mode selected from the plurality of encoding modes of the external encoder. The artificial neural network is trained to select using image data an encoding mode of the plurality of encoding modes of the external encoder using one or more differentiable functions configured to emulate an encoding process. The method also comprises outputting the generated output data from the artificial neural network to the external encoder to enable the external encoder to encode the image data using the selected encoding mode.

It will of course be appreciated that features described in relation to one aspect of the present disclosure described above may be incorporated into other aspects of the present disclosure.

DESCRIPTION OF THE DRAWINGS

Embodiments of the present disclosure will now be described by way of example only with reference to the accompanying schematic drawings of which:

FIGS. 6(a) to 6(c) are schematic diagrams showing a neural network, in accordance with embodiments.

DETAILED DESCRIPTION

Embodiments of the present disclosure are now described.

Figure 1:
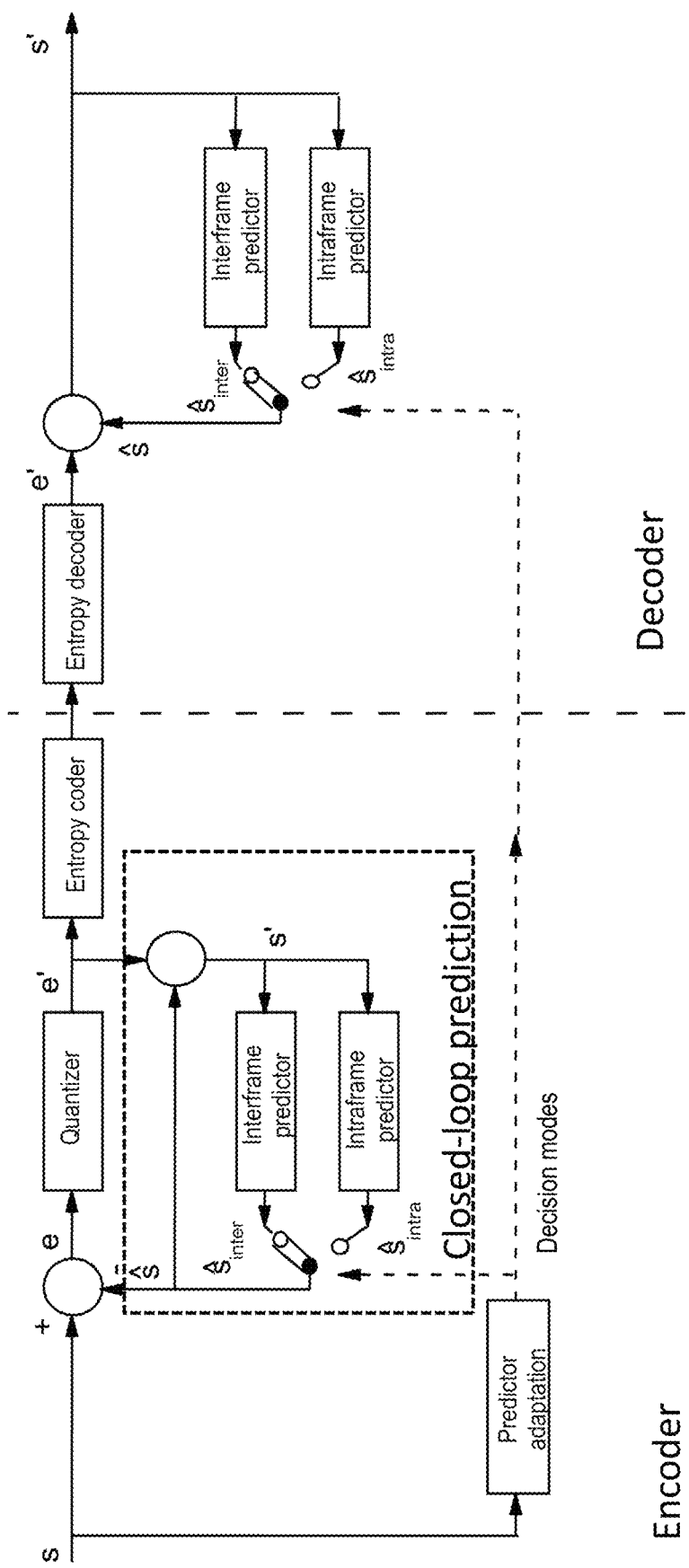
FIG. 1 is a schematic diagram showing example encoding and decoding processes, in accordance with embodiments.

FIG. 1 is a schematic diagram showing encoding and decoding processes, according to embodiments. In particular, FIG. 1 shows schematically an example of a closed-loop lossy signal encoding system.

At the encoder, the current frame of an input signal s is received and intra- or inter-predicted (e.g. predicted using signal values from within the current frame s or from one or more previous frames, ŝ, respectively), using a selected one of various predetermined prediction modes. In the example shown in FIG. 1, inter-prediction is used. The prediction error (or 'residual'), e, is transformed, quantized and reconstructed to e', which is then entropy coded without any further fidelity loss. The produced bitstream from the encoder can then be stored or transmitted over a network to the corresponding decoder.

At the decoder, the reconstructed error signal e' is added to the reconstructed previous frame ŝ to reconstruct signal s'. Signal s' is a lossy approximation of s. The reconstruction of signal s' is also carried out at the encoder in order to use s' as a reference signal for subsequent inter-prediction for the next frame of the input signal.

In known encoder systems, predictor adaptation functionality (e.g. the functionality deciding which prediction mode is to be used), and the decision of quantization step size, are implemented using a hand-crafted algorithm. This forms the basis for typical video coding standards, such as AVC/H.264, HEVC/H.265, VVC/H.266, AOMedia VP9, AV1, AV2, etc.

In contrast with such systems, the methods disclosed herein provide a pixel-to-decision-mode (PDM) artificial neural network which, once trained, replaces the hand-crafted algorithms for controlling the decisions on prediction modes and quantization settings. This is described in more detail below. With reference to FIG. 1, the trained PDM network controls the predictor adaptation block and/or the quantization parameters of the quantizer. When the trained PDM network is deployed and used to determine prediction modes and/or quantization parameters, the remainder of the operation shown in FIG. 1 is unaltered. This ensures that existing decoders can operate as normal and no change is needed in the bitstream packaging, transport or decoding stages.

The embodiments depicted are applicable to batch processing, i.e. processing a group of images or video frames together without delay constraints (e.g. an entire video sequence), as well as to stream processing, i.e. processing only a limited subset of a stream of images or video frames, or even a select subset of a single image, e.g. due to delay or buffering constraints.

Figure 2:
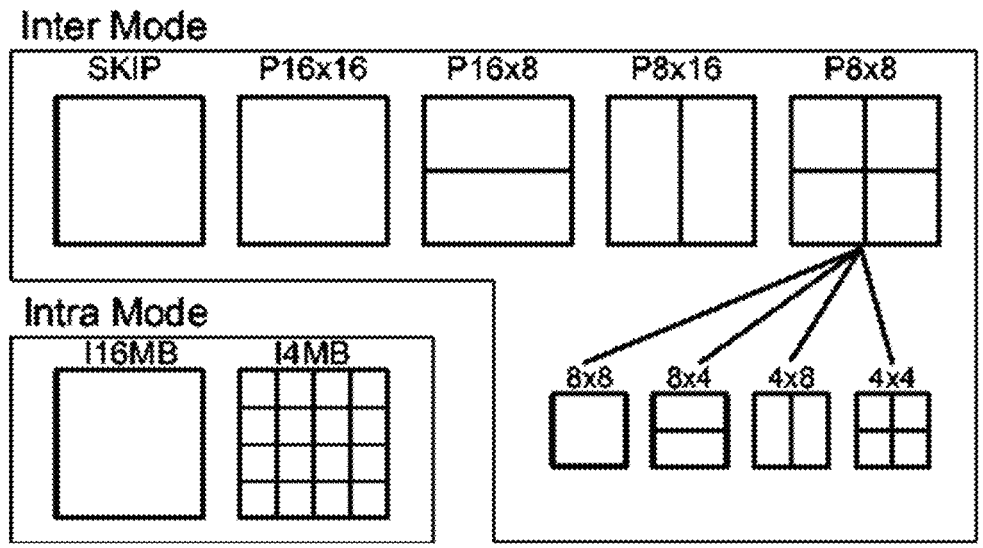
FIG. 2 is a schematic diagram showing example encoding modes, in accordance with embodiments.
Figure 2:
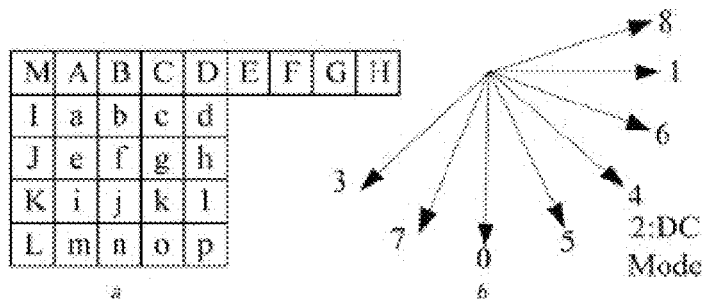

FIG. 2 shows examples of encoding modes associated with the AVC/H.264 standard. Encoding modes may also be referred to as "decision modes", in that they comprise modes which are to be decided upon (e.g. selected) for use in encoding. The 'P' blocks correspond to inter-predicted blocks of different sizes. The 'I' blocks correspond to intra-predicted blocks from the causal neighborhood of blocks (whereby blocks are scanned via raster scan within each frame from the top left to the bottom right). The predefined intra-prediction directions are shown in the bottom-right part of FIG. 2.

The examples shown in FIG. 2 also depict transform and quantization parameters specified by the AVC/H.264 standard. The transform is a block matrix H, given by:

$$H = \begin{bmatrix} a & \ldots & b \\ \vdots & \ddots & \vdots \\ c & \ldots & d \end{bmatrix},$$

with coefficients a, b, c, d, . . . as specified by the standard. The 1D transform of data block D is given by: X=HD.

Quantization of the (i, j)th sample of X is carried out by:

$$X_q(i,j) = \text{sign}\{X(i,j)\}[(|X(i,j)|A(Q)+f2^L) >> L]$$

where Q is the quantization level varying from 0 to $Q_{max}$, A(Q) is the quantization function, f is a parameter controlling the quantizer dead zone size, and L is the quantization step size.

The reconstruction of samples of data block D is given by:

$$X_r(i,j) = X_q(i,j)B(Q)$$

$$D_r = (H^T X_r + 2^{N-1} E) >> N$$

where B(Q) is the reconstruction function, selected such that $A(Q)B(Q)G^2$ reaches a maximum value and G is the squared norm of the rows of H, E is a matrix of unity values, and N controls the dynamic range of the reconstruction.

The objective of an optimized AVC/H.264 encoder is to convert the input video frame pixels into P or I decision modes, and quantize and encode the residual information such that the required rate, r, and the reconstructed signal distortion, d, are both minimized. This may be formulated as minimizing the regularized rate-distortion cost: r+λd, with λ being the selected regularization coefficient controlling the relative emphasis on rate or distortion. The value of λ as a regularization coefficient may be input to the workflow of the methods described herein, as described in more detail below. If distortion is quantified by multiple functions of measurements (e.g. $d_1, d_2, \ldots, d_K$), then K regularization coefficients $(\lambda_1, \lambda_2, \ldots, \lambda_K)$ may be used. These multiple distortion functions or measurements could correspond to multiple quality metrics, which may include, but are not limited to, a structural similarity index metric (SSIM), video multimethod assessment fusion (VMAF), mean opinion scores (MOS) from human viewers, and others.

Figure 3:
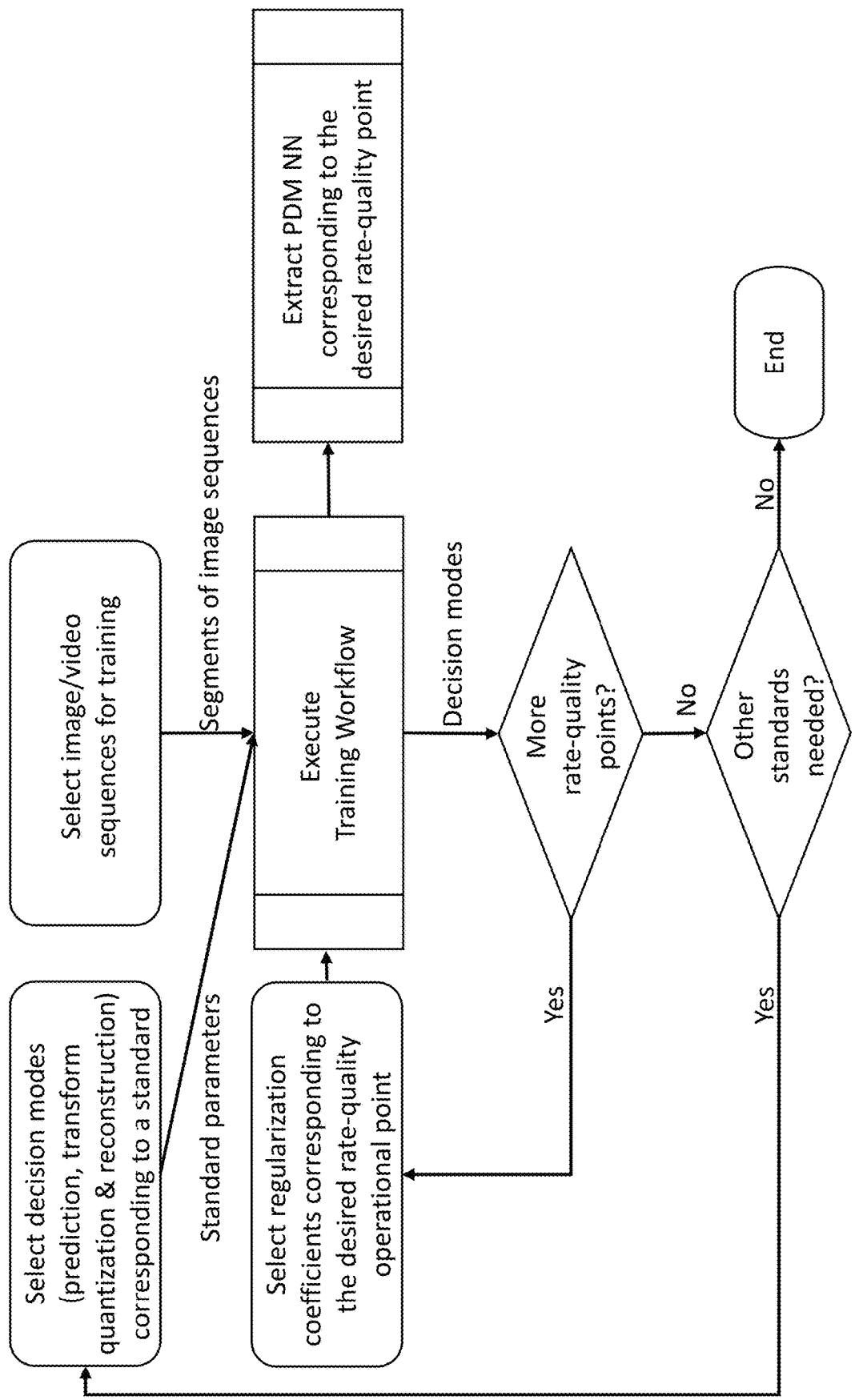
FIG. 3 is a schematic workflow diagram showing an example training process, in accordance with embodiments.
Figure 4:
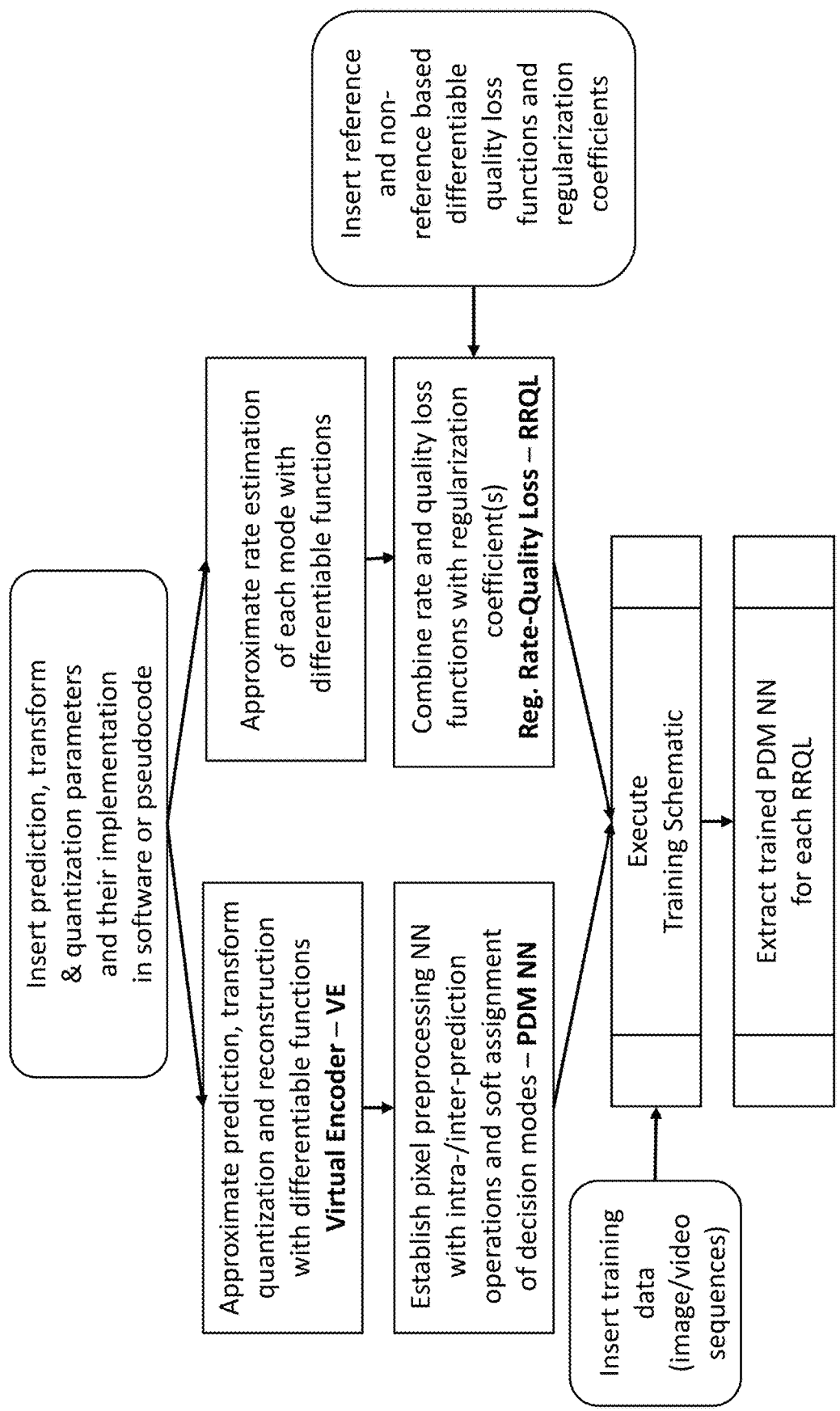
FIG. 4 is a schematic workflow diagram showing an example training process, in accordance with embodiments.
Figure 5:
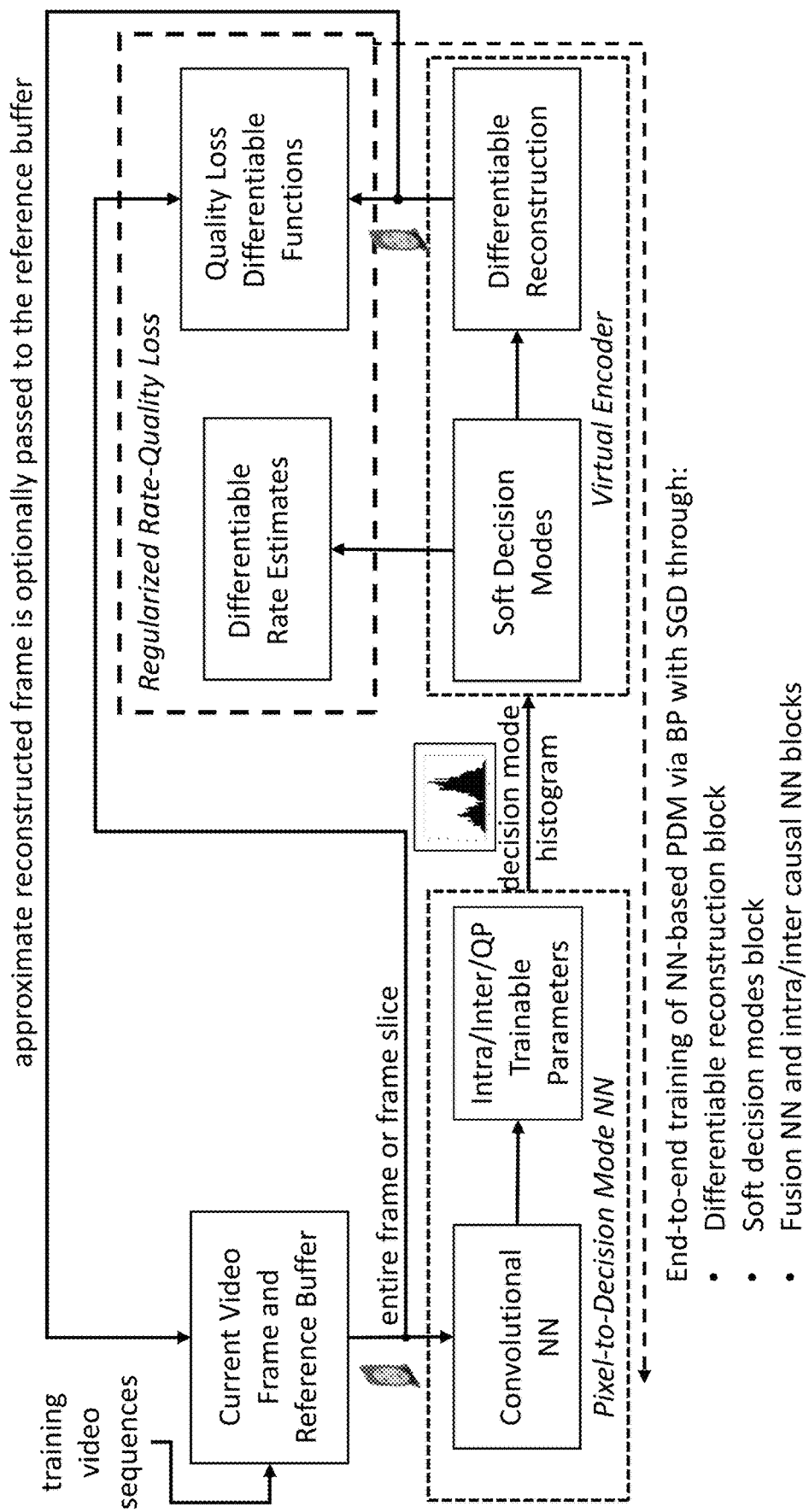
FIG. 5 is a schematic diagram showing example training processes, in accordance with embodiments.

FIGS. 3 and 4 show an example workflow of the training process of the neural (or 'PDM') network. An example training schematic (which is referred to in FIGS. 3 and 4) is shown in FIG. 5.

The first two steps of the overall training workflow (shown in FIG. 3) involve the receipt (or selection) of the plurality of encoding modes of a standard coding framework, as well as the image/video sequences to use for training. Any image or video sequences may be used for training. Batches of training data can be selected in a deterministic or random/pseudo-random manner. The third step involves the receipt (or selection) of one or more regularization coefficients that are to be used together with the rate and quality loss functions of the training process. With these sets of inputs, the training workflow shown in FIG. 4 is executed, and the trained PDM network corresponding to these inputs is derived and can be subsequently be deployed for inference at a given rate and signal quality.

If more rate-quality points are desired (as shown in FIG. 3), different regularization coefficients are derived and the process is repeated in order to derive a new instantiation of the PDM network corresponding to a different rate-quality point. If more standard encoding frameworks are desired to be used, then new sets of encoding modes are input and the process shown in FIG. 3 is repeated.

Referring to the training process shown in FIG. 4, given the encoding modes (e.g. prediction, transform and/or quantization parameters) of a given encoder, the first two steps are to: (i) enable all operations to be carried out by differentiable functions; and (ii) approximate the required rate of each encoding mode with a differentiable function.

Concerning step (i), forward and inverse transforms and translational or directional prediction modes are differentiable functions as they involve linear operations. On the other hand, quantization to a set of discrete values is by its nature non-differentiable due to the use of rounding (e.g. a shift operation). Therefore, the noise of rounding is approximated with a differentiable function. For example, an additive uniform noise can be used:

$$X_q(i,j) = X(i,j) + \Delta x,$$

where $\Delta x$ is additive independent and identically distributed (IID) uniform noise with support width chosen to correspond to the rounding by the integer division carried out when shifting by L bits in the original quantization operation.

Another source of initially non-differentiable operations relates to the hard assignment of prediction modes for inter- or intra-prediction that are derived adaptively based on the input signal blocks and the reference blocks. In such cases, the problem may be expressed as finding the decision mode vector m that minimizes the error of its corresponding inter-/intra-prediction:

$$m^* = \mathrm{argmin}_m \{e(m)\},$$

where $e(m)$ expresses the prediction error under decision mode vector m.

Given that the argmin operation has zero gradients almost everywhere with respect to the input and is therefore not differentiable, such decision mode selection functions are converted into differentiable functions by using a straight-through estimator $1_{\mathrm{argmin}_m(e)}$, where the vector is 1 at index $m^*$ and zero everywhere else. $-e$ is then transformed into a continuous categorical distribution that approximates the one-hot distribution by taking the softmax function: $e_s = \mathrm{softmax}(-e)$. The straight-through estimator can then be defined as $1_m^* = e_s + \mathrm{stop\_gradient}(1_{\mathrm{argmin}_m(e_s)})$. Therefore, in the forward pass (inference) the stop_gradient( ) function is treated as an identity function and the argmin is computed as normal. However, when training with back-propagation and stochastic gradient descent, in the backward pass only the gradient of the softmax( ) function, $e_s$, is used. This ensures that gradients can be back-propagated through such hard assignments of decision (e.g. encoding) modes.

Concerning step (ii), rate estimations can be approximated by continuous and differentiable functions. For example, the rate to encode a given symbol stream can be modelled as a variation of its entropy, or by using divisive normalization techniques that are shown to convert the produced symbols into normal distributions and then assuming independent univariate density models for each sub-band parameterized by a small set of Gaussian kernels.

The next two steps of the training workflow shown in FIG. 4 involve the establishment of the PDM network structure and the regularized rate-quality loss (RRQL) functions. Concerning the latter, usage of quality metrics such as (MAX_PSNR-PSNR) and (1-SSIM) can take place (where PSNR and SSIM are differentiable distortion functions and MAX_PSNR is the maximum PSNR value of interest), since these quality metrics comprise differentiable functions. The regularization coefficients are provided via external input, and act to balance the impact of each of these quality metrics. Minimizing such quality metrics enables the signal fidelity to be maximized. Other quality metrics can also be used (e.g. 100-VMAF), and the components within such metrics can be approximated by differentiable functions.

Concerning the PDM network structure, the intra-/inter-prediction and/or quantization modes of the utilized standard are converted into operations with parameters that are learnable. For example, the block displacement search of all P modes and the directional prediction modes are unrolled as sequential block difference operations, with different difference weightings. For H.264/AVC, these weights implement the intra/inter-prediction directions of the modes shown in FIG. 2. The sequential block difference operations are implemented with trainable parameters for the difference position and relative impact (e.g. the impact of different block sizes vs prediction error is controlled via a regularization coefficient). The sum of absolute differences or the sum of squared differences may be used as a prediction error metric.

Prior to the PDM network structure, image pixels are preprocessed (e.g. filtered) using a neural network structure comprising a multilayer convolutional neural network. This neural pixel processing assists in preprocessing the input image content such that prediction and/or quantization mode selection is optimized according to end-to-end back-propagation learning that incorporates the decoder-side reconstruction stage. Both of these structures are shown in FIG. 5, which depicts an example training schematic used within the workflows of FIGS. 3 and 4. The preprocessing neural network may be separate from the PDM network structure (as depicted in the example shown in FIG. 5), or a single network structure may be configured to perform both functions.

When training image/video sequence data is inserted into the training schematic, training of the PDM network takes place based on back-propagation and stochastic gradient descent, and the use of the RRQL functions as losses. Approximated reconstructed frames can also enter the reference buffer (shown in FIG. 5) to be used as references for future frames. This leads to the derivation of the trained PDM network. As shown in FIG. 5, the output of the PDM network during training is a vector comprising soft decisions, e.g. the probability that a certain encoding mode will be chosen at a given moment.

A virtual encoder module is also used in the framework depicted in FIG. 5. The virtual encoder module comprises one or more differentiable functions that are configured to emulate and/or approximate an encoding process (which may be the same as, or different from, the encoding process of an actual encoder). For example, the virtual encoder module may include a prediction component, a frequency transform component, a quantization and entropy encoding component, and a dequantization and inverse transform component. The virtual encoder module is configured to process the training image data using the soft decision modes specified by the PDM network. As such, the virtual encoder module may include differentiable functions that are configured to emulate the operations of the various encoding modes.

The purpose of the virtual encoder module is to emulate a typical image or video encoder using differentiable and learnable components, such as the layers of an artificial neural network. The frequency transform component is any variation of discrete sine or cosine transform or wavelet transform, or an atom-based decomposition. The dequantization and inverse transform component can convert the transform coefficients back into approximated pixel values. The main source of loss for the virtual codec module comes from the quantization component, which emulates any multi-stage dead zone or non-dead zone quantizer. Finally, the entropy coding component can be a continuous differentiable approximation of theoretical (ideal) entropy over transform values, or continuous differentiable representation of a Huffman encoder, an arithmetic encoder, a runlength encoder, or any combination of those that is also made to be context adaptive, i.e., looking at quantization symbol types and surrounding values (context conditioning) in order to utilize the appropriate probability model and compression method.

A rate loss may be calculated by minimizing the rate predicted from the virtual encoder model processing (e.g. virtually encoding and decoding) the quantized coefficients stemming from the soft decision modes. This rate loss is optimized as a function of the weights of the PDM network, by back-propagation using variations of gradient descent methods, in order to train the PDM network. Beyond its utility as a rate estimator, the virtual encoder module also produces distorted (or corrupted) image outputs, which can be used to obtain a quality loss function that is in turn useable to train the PDM network. As described above, the rate and/or quality loss functions can themselves be converted into differentiable operators.

In some embodiments, prior to or during the training of the PDM network itself, any parameters associated with the virtual encoder module can also be empirically tuned or trained with back-propagation and gradient descent methods. This can include, for example, training any transform and quantization parameters that are differentiable, and also the artificial neural network parameters used to represent the non-differentiable mathematical operations of the transform and quantization parts with differentiable approximations, e.g. by using the actual rate to encode the same pixels with a lossy JPEG, MPEG or AOMedia open encoder as a reference.

Figure 6C:
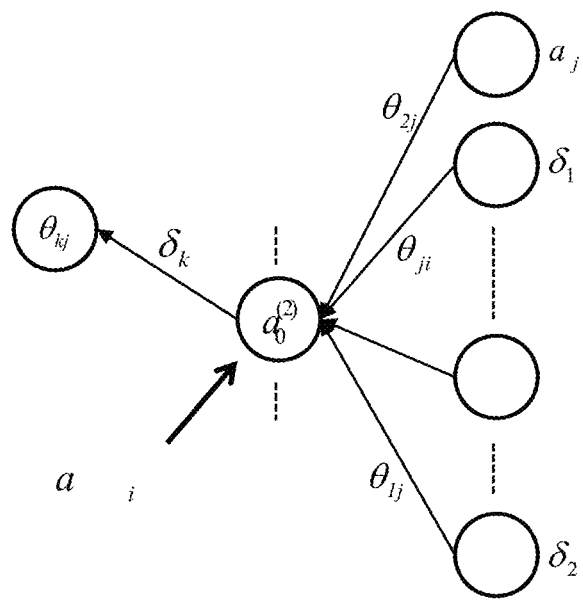

The PDM network as described herein can comprise any combination of weights connected in a network and having a non-linear function (akin to an activation function of an artificial neural network). An example of such connections and weights is shown in FIG. 6(a). An example of the global connectivity between weights and inputs is shown in FIG. 6(b). That is, FIG. 6(a) shows a combination of inputs $x_0, \ldots, x_3$ with weight coefficients $\Theta$ and non-linear activation function g( ), and FIG. 6(b) is a schematic diagram showing layers of interconnected activations and weights, forming an artificial neural network. Such examples are trained with back-propagation of errors computed at the output layer, using gradient descent methods. This is shown in FIG. 6(c), which depicts schematically the back-propagation of errors $\delta$ from coefficient $a_0^{(2)}$ of an intermediate layer to the previous intermediate layer using gradient descent.

Figure 7:
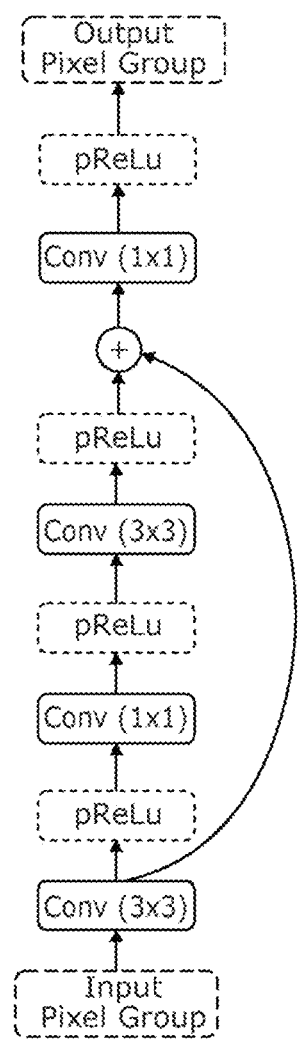
FIG. 7 is a schematic diagram showing a neural network, in accordance with embodiments.

An example multi-layer neural network processing pipeline is shown in FIG. 7. In particular, FIG. 7 shows a cascade of convolutional (Cony (k×k)) and parametric ReLu (pReLu) layers of weights and activation functions mapping input pixel groups to transformed output pixel groups. Each layer receives codec settings as input, along with the representation from the previous layer. Convolutional layers extend the example of FIG. 6(b) to multiple dimensions, by performing convolution operations between multi-dimensional filters of fixed kernel size (k×k) with learnable weights and the inputs to the layer. In embodiments, some layers have dilated convolutions or pooling components to increase or decrease the resolution of the receptive field. The connectivity of the cascade of convolutional layers and activation functions can also include skip connections, as shown by the connection from the output of the leftmost "Cony (3×3)" layer of FIG. 7 to the summation point of FIG. 7. In addition, the entirety of the cascade of multiple layers (also known as a deep neural network) is trainable end-to-end based on back-propagation of errors from the output layer backwards (e.g. as shown in FIG. 6(c)), using gradient descent methods.

Figure 8:
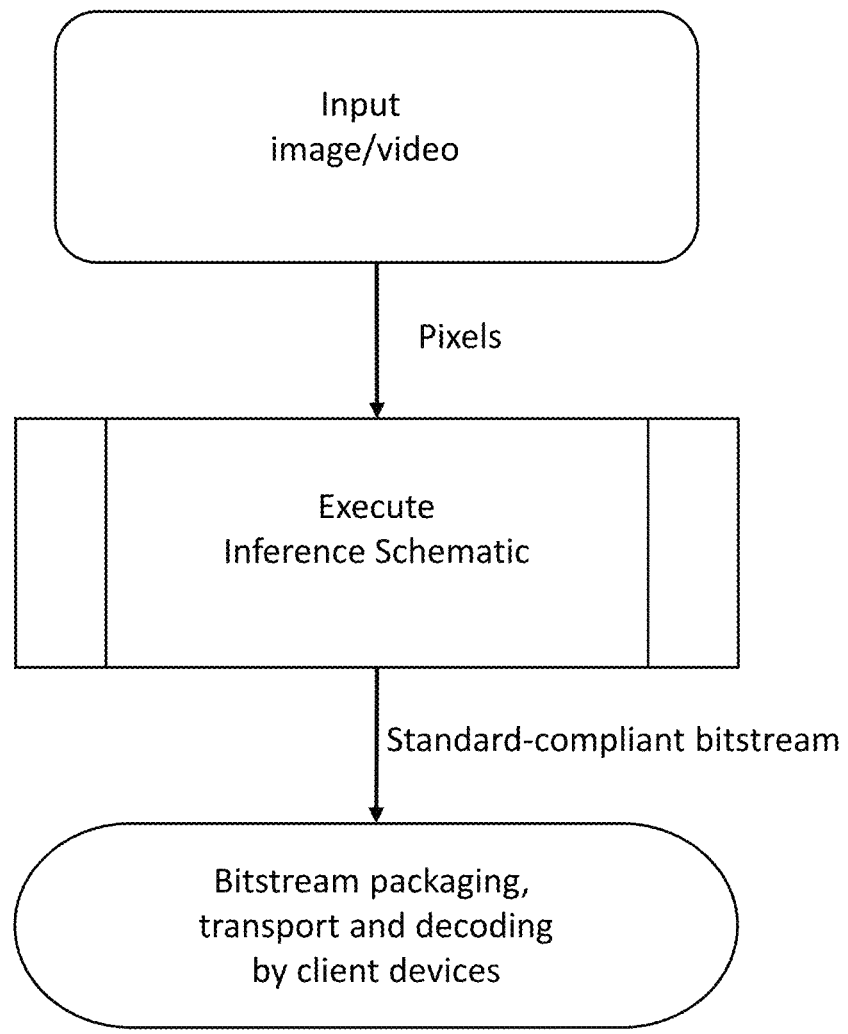
FIG. 8 is a schematic workflow diagram showing an example inference process, in accordance with embodiments.
Figure 9:
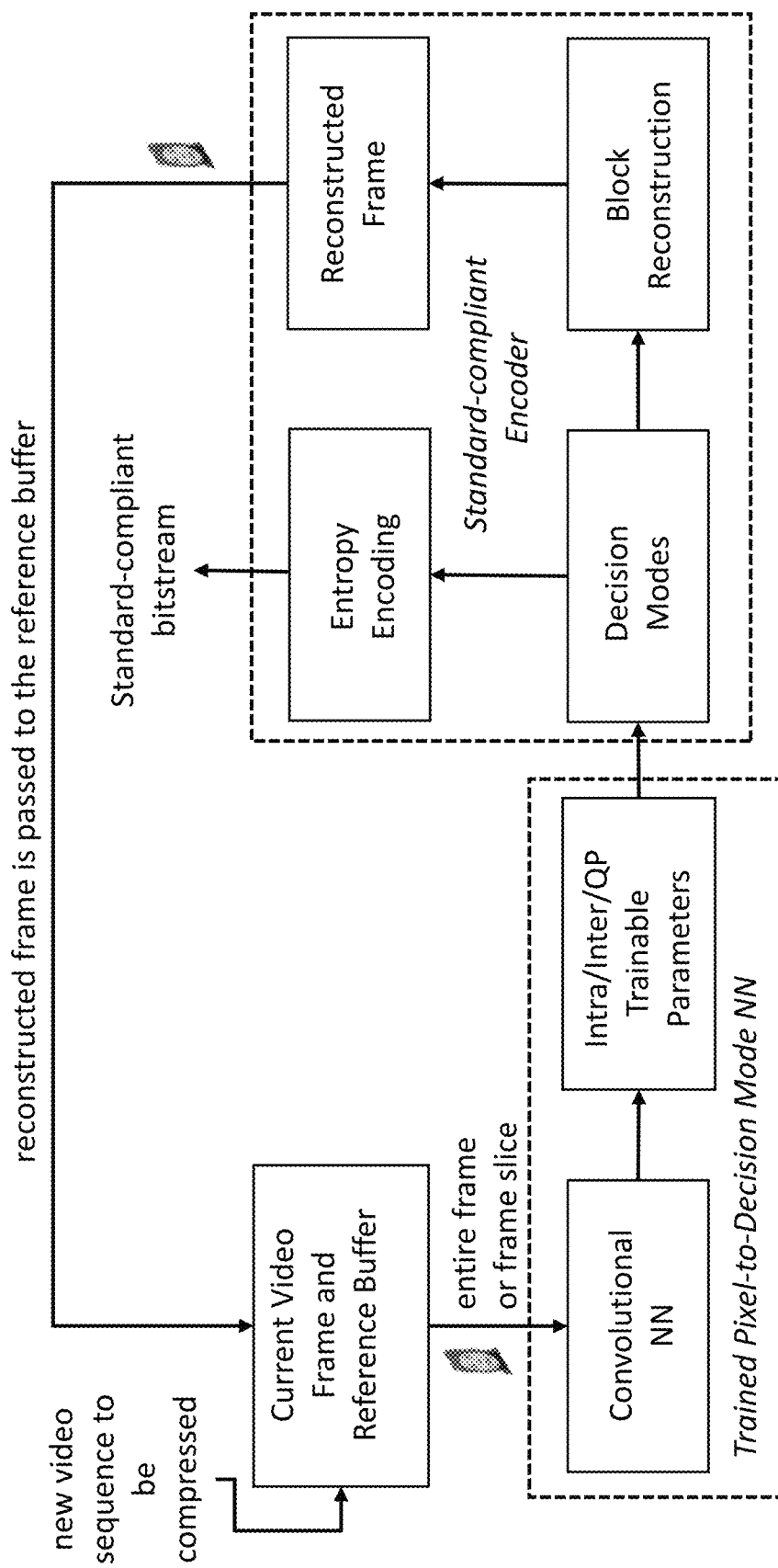
FIG. 9 is a schematic diagram showing example inference processes, in accordance with embodiments.

FIG. 8 shows an example workflow of the inference process of the PDM network (e.g. during deployment and after training of the PDM network). FIG. 9 shows an example inference schematic that is used within the workflow of FIG. 8.

As shown in FIGS. 8 and 9, an image or video sequence to be compressed is input to a buffer, before a frame (or frame slice) is passed from the buffer to the trained PDM network. In this example, the trained PDM network includes the convolutional prefiltering neural network configured to prefilter the image data, as described above. The trained PDM network outputs encoding mode decisions to a standard-compliant external encoder, to enable the external encoder to encode the image data using the selected encoding mode(s). As such, in contrast to the training workflow, during inference the processing of the image data according to the selected encoding mode(s) is carried out by an actual encoding block that remains compliant to the standard. That is, the actual (standard-compliant) encoder replaces the virtual encoder that is used during training. Additionally, frames produced as reconstructed frames can be passed back to the buffer to be used as references for future frames.

Figure 10:
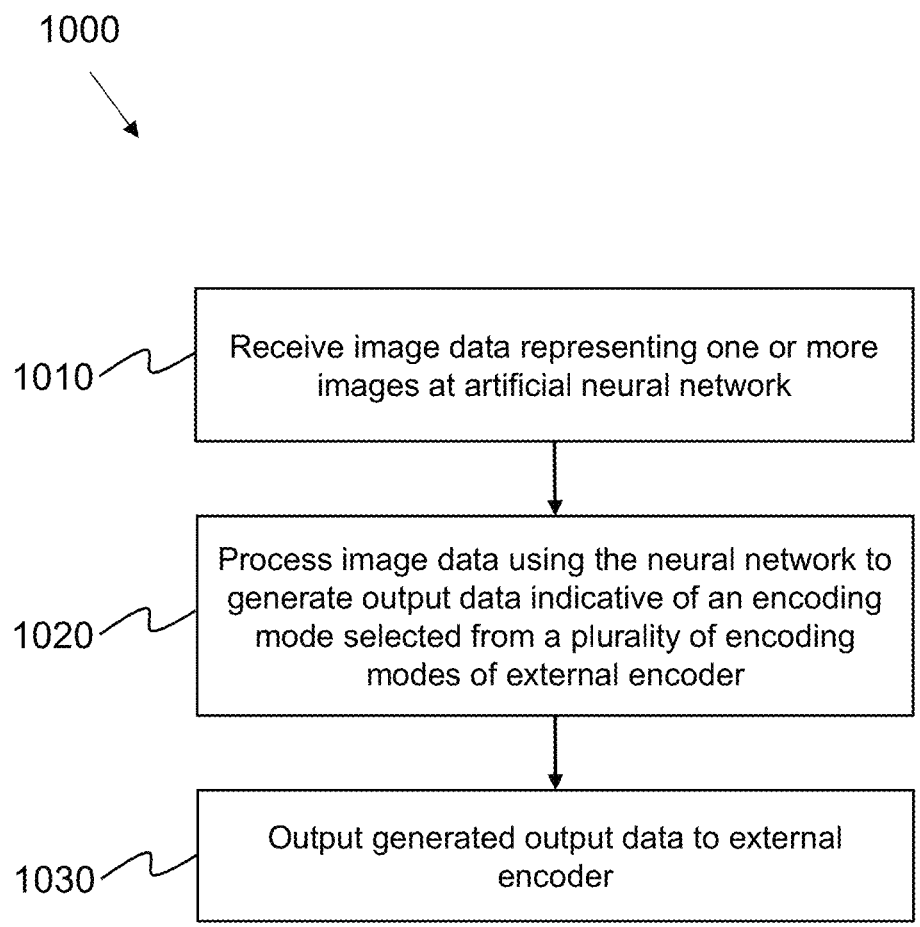
FIG. 10 is a flowchart showing the steps of a method of processing image data, in accordance with embodiments.

FIG. 10 shows a method 1000 for processing image data using an artificial neural network. The method 1000 may be performed by a computing device, according to embodiments. The method 1000 may be performed at least in part by hardware and/or software. The processing is performed prior to encoding the processed image data with an external encoder. The external encoder is operable in a plurality of encoding modes. The plurality of encoding modes may be comprise a plurality of predefined encoding modes (e.g. associated with a particular image or video coding standard), according to embodiments. The artificial neural network may comprise a set of interconnected adjustable weights.

At item 1010, image data representing one or more images is received at the artificial neural network. The image data may be retrieved from storage (e.g. in a memory), or may be received from another entity.

At item 1020, the image data is processed using the artificial neural network (e.g. by applying the weights of the artificial neural network to the image data) to generate output data indicative of an encoding mode selected from the plurality of encoding modes of the external encoder. The artificial neural network is trained to select using image data an encoding mode of the plurality of encoding modes of the external encoder using one or more differentiable functions configured to emulate an encoding process.

At item 1030, the generated output data is outputted from the artificial neural network to the external encoder to enable the external encoder to encode the image data using the selected encoding mode.

In embodiments, the plurality of encoding modes of the external encoder comprises a plurality of prediction modes for encoding image data using predictive coding. The plurality of prediction modes relate to intra-predication and/or inter-prediction.

In embodiments, one or more of the plurality of encoding modes of the external encoder comprises a plurality of quantization parameters useable by the external encoder to encode image data.

In embodiments, the plurality of encoding modes are associated with an image and/or video coding standard.

In embodiments, each of the plurality of encoding modes of the external encoder generates (e.g. enables the generation of) an encoded bitstream having a format that is compliant with an image and/or video coding standard.

In embodiments, the neural network is configured to select the encoding mode from the plurality of encoding modes based on image content of the received image data. For example, the neural network may be configured to select the encoding mode based on pixel data.

In embodiments, the neural network is trained using one or more differentiable functions configured to emulate operations associated with the plurality of encoding modes.

In embodiments, the neural network is trained to optimize a rate score indicative of the bits required by the external encoder to encode output pixel representations generated using the encoding modes. In embodiments, the rate score is calculated using one or more differentiable functions configured to emulate an encoding process. In embodiments, the rate score is calculated using a differentiable rate loss function. In embodiments, the output pixel representations are generated at the neural network.

In embodiments, the neural network is trained to optimize a quality score indicative of the quality of reconstructed pixel representations generated using the encoding modes. In embodiments, the quality score is calculated using one or more differentiable functions configured to emulate an encoding process. In embodiments, the quality score is calculated using a differentiable quality loss function. In embodiments, the quality score is indicative of at least one of: signal distortion in the reconstructed pixel representations; and loss of perceptual and/or aesthetic quality in the reconstructed pixel representations. In embodiments, the reconstructed pixel representations are generated using the artificial neural network.

In embodiments, the neural network is trained using one or more regularization coefficients corresponding to a desired rate-quality operational point.

In embodiments, the method 1000 further comprises determining one or more loss functions (e.g. errors) based on the generated output data, and adjusting the neural network using back-propagation of values of the one or more loss functions.

In embodiments, the method 1000 comprises preprocessing (e.g. pre-filtering) the image data prior to processing the image data using the neural network. The preprocessing operation may be performed using an artificial neural network.

In embodiments, the method 1000 further comprises, at the external encoder, receiving the output data from the neural network, and encoding the image data using the selected encoding mode to generate an encoded bitstream. In embodiments, the encoded bitstream is compliant with an image and/or video coding standard that is associated with the plurality of encoding modes from which the encoding mode is selected.

Figure 11:
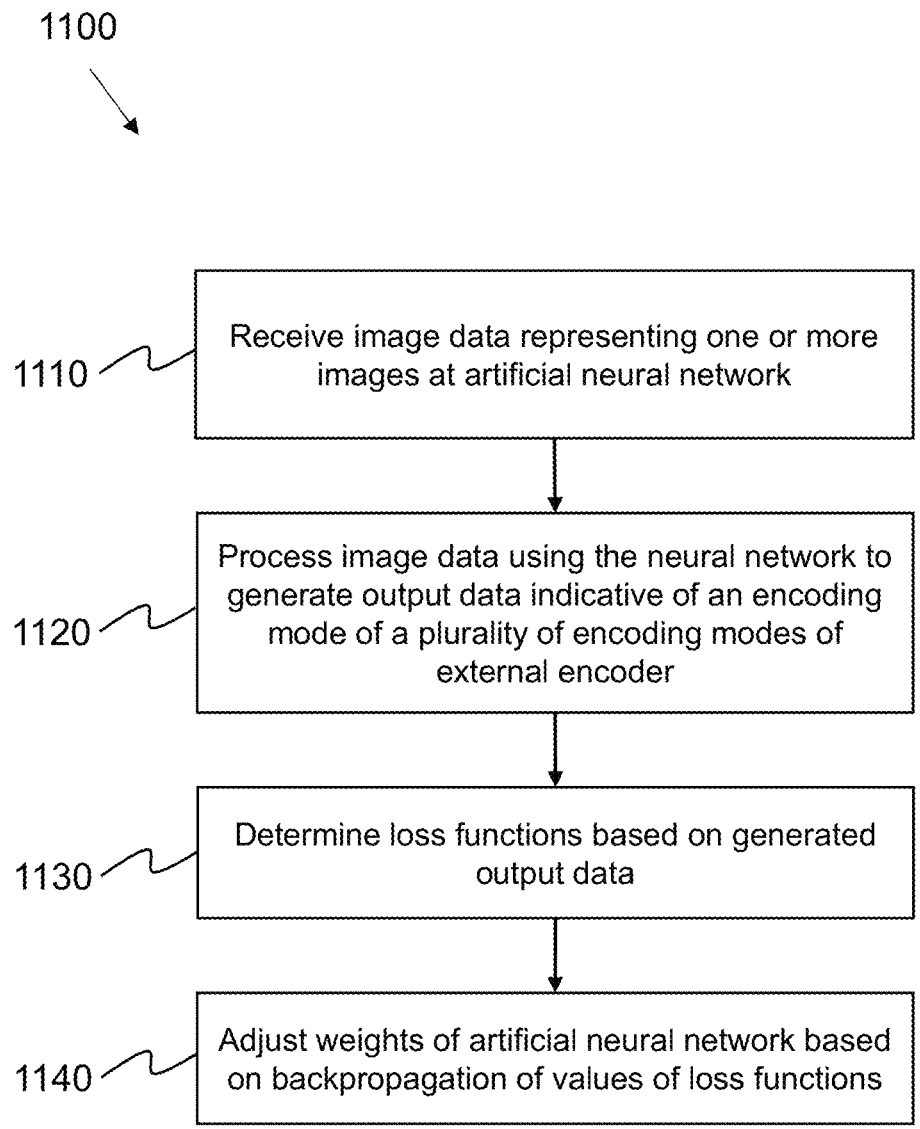
FIG. 11 is a flowchart showing the steps of a method of configuring a neural network, in accordance with embodiments.

FIG. 11 shows a method 1100 of configuring an artificial neural network for processing image data prior to encoding using an external encoder. The method 1100 may be performed by a computing device, according to embodiments. The method 1100 may be performed at least in part by hardware and/or software. The external encoder is operable in a plurality of encoding modes. The plurality of encoding modes may be comprise a plurality of predefined encoding modes (e.g. associated with a particular image or video coding standard), according to embodiments. The artificial neural network comprises a set of interconnected adjustable weights. The neural network is arranged to select using image data an encoding mode of the plurality of encoding modes of the external encoder using one or more differentiable functions configured to emulate an encoding process.

At item 1110, image data representing one or more images is received at the neural network.

At item 1120, the image data is processed using the neural network to generate output data indicative of an encoding mode of the plurality of encoding modes. In embodiments, the generated output data comprises a soft output, e.g. a vector comprising soft decisions on encoding modes. For example, the generated output data may indicate the probability that a given encoding mode will be selected at a given moment.

At item 1130, one or more loss functions are determined based on the generated output data. The one or more loss functions may comprise a quality loss function associated with reconstructed pixel representations generated using the encoding modes (e.g. emulating reconstructed pixel representations derivable by an external decoder). The one or more loss functions may additionally or alternatively comprise a rate loss function associated with output pixel representations generated using the encoding modes (e.g. emulating output pixel representations that may be generated by the external encoder).

At item 1140, the weights of the artificial neural network are adjusted based on back-propagation of values of the one or more loss functions.

Figure 12:
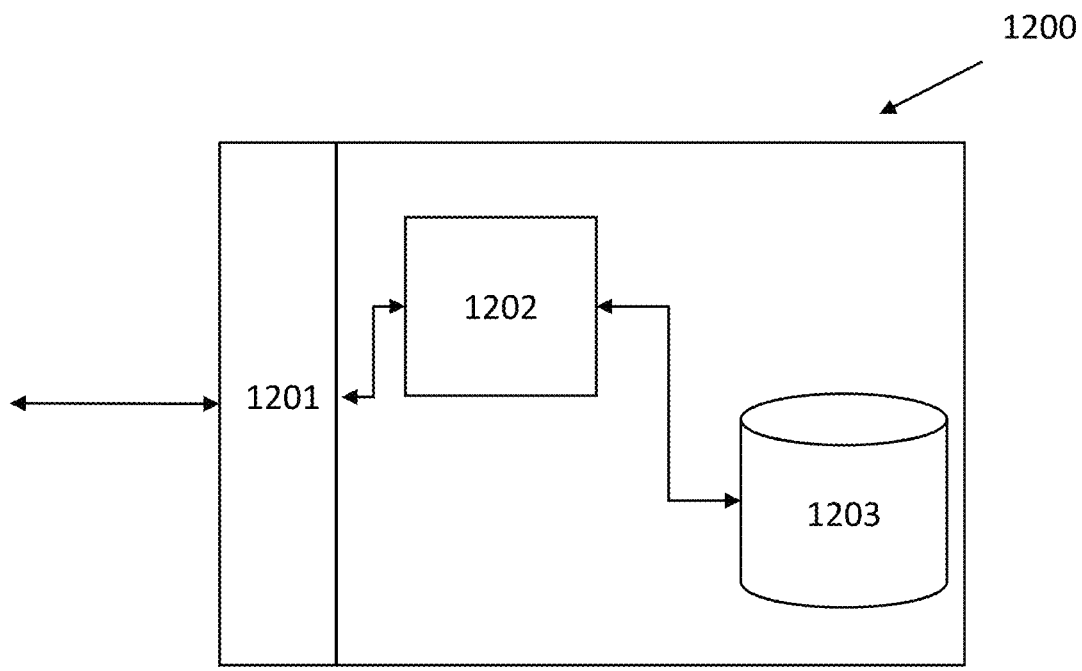
FIG. 12 is a schematic diagram of a computing device, in accordance with embodiments.

Embodiments of the disclosure include the methods described above performed on a computing device, such as the computing device 1200 shown in FIG. 12. The computing device 1200 comprises a data interface 1201, through which data can be sent or received, for example over a network. The computing device 1200 further comprises a processor 1202 in communication with the data interface 1201, and memory 1203 in communication with the processor 1202. In this way, the computing device 1200 can receive data, such as image data or video data, via the data interface 1201, and the processor 1202 can store the received data in the memory 1203, and process it so as to perform the methods of described herein, including processing image data prior to encoding using an external encoder, and optionally encoding the processed image data.

Each device, module, component, machine or function as described in relation to any of the examples described herein may comprise a processor and/or processing system or may be comprised in apparatus comprising a processor and/or processing system. One or more aspects of the embodiments described herein comprise processes performed by apparatus. In some examples, the apparatus comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device, etc.

The present disclosure provides a neural network design that processes input image content and emulates the mathematical operations of the encoding modes (e.g. prediction modes) of a given image/video standard while allowing for the weights and/or connections of the neural network to be trained with back-propagation and stochastic gradient descent. The process that maps encoding decision modes to bitrate is converted into a set of differentiable mathematical functions that can provide for an estimate of the required encoding bitrate. Further, the reconstruction process of the decoder-side image or video frame (or slice) is, in some examples, converted into a set of differentiable mathematical functions that can provide an approximation of the reconstructed pixels. Loss functions are used to estimate quality loss between the input pixels and the approximate reconstruction, and a combination of such loss functions with the rate estimate form a final regularized loss function. End-to-end training of the pixel-to-decision-mode neural network is performed using back-propagation and stochastic gradient descent to minimize the regularized loss function for a set of training data.

As such, the methods disclosed herein convert the encoding process into a fully-neural system, while allowing for backward compatibility to existing standards. This replaces the hand-crafted design previously used for encoder optimization and mode selection with an end-to-end learnable system based on data that is more flexible than the previous hand-crafted methods. Further, the disclosed methods treat the normative part of the standard (e.g. the operations of the decision modes themselves and lossless encoding to produce a standard-compliant bitstream) as an implementation 'substrate' that remains unaltered, thereby ensuring standard-compliance.

While the present disclosure has been described and illustrated with reference to particular embodiments, it will be appreciated by those of ordinary skill in the art that the disclosure lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the disclosure that are described as preferable, advantageous, convenient or the like are optional and do not limit the scope of the independent claims. Moreover, it is to be understood that such optional integers or features, whilst of possible benefit in some embodiments of the disclosure, may not be desirable, and may therefore be absent, in other embodiments.

What is claimed is:

1. A computer-implemented method of processing, prior to encoding using an external encoder, image data using an artificial neural network, wherein the external encoder is operable in a plurality of encoding modes, the method comprising:
receiving, at the artificial neural network, the image data representing one or more images;
processing the image data using the artificial neural network to generate output data indicative of a selected encoding mode selected from the plurality of encoding modes of the external encoder, wherein:
the artificial neural network is trained to select the selected encoding mode from the plurality of encoding modes using the image data and one or more differentiable functions configured to emulate an encoding process, the one or more differentiable functions being configured to emulate operations associated with the plurality of encoding modes of the external encoder, and
the artificial neural network is trained independently of the external encoder; and
outputting the generated output data from the artificial neural network to the external encoder to enable the external encoder to encode the image data using the selected encoding mode.

2. The method according to claim 1, wherein the plurality of encoding modes comprise a plurality of prediction modes for encoding the image data using predictive coding, the plurality of prediction modes relating to intra-prediction and/or inter-prediction.

3. The method according to claim 1, wherein one or more of the plurality of encoding modes comprise a plurality of quantization parameters useable by the external encoder to encode the image data.

4. The method according to claim 1, wherein the plurality of encoding modes are associated with an image and/or video coding standard.

5. The method according to claim 1, wherein each of the plurality of encoding modes generates an encoded bitstream having a format that is compliant with an image and/or video coding standard.

6. The method according to claim 1, wherein the artificial neural network is configured to select the selected encoding mode from the plurality of encoding modes based on image content of the received image data.

7. The method according to claim 1, wherein the artificial neural network is trained to optimize a rate score indicative of bits required by the external encoder to encode output pixel representations generated using the plurality of encoding modes.

8. The method according to claim 7, wherein the rate score is calculated using the one or more differentiable functions configured to emulate the encoding process.

9. The method according to claim 7, wherein the rate score is calculated using a differentiable rate loss function.

10. The method according to claim 7, further comprising generating the output pixel representations at the artificial neural network.

11. The method according to claim 1, wherein the artificial neural network is trained to optimize a quality score indicative of a quality of reconstructed pixel representations generated using the plurality of encoding modes.

12. The method according to claim 11, wherein the quality score is calculated using the one or more differentiable functions configured to emulate the encoding process.

13. The method according to claim 11, wherein the quality score is calculated using a differentiable quality loss function.

14. The method according to claim 11, wherein the quality score is indicative of at least one of:
  signal distortion in the reconstructed pixel representations; or
  loss of perceptual and/or aesthetic quality in the reconstructed pixel representations.

15. The method according to claim 1, wherein the artificial neural network is trained using one or more regularization coefficients corresponding to a desired rate-quality operational point.

16. The method according to claim 1, further comprising:
  determining one or more loss functions based on the generated output data; and
  adjusting the artificial neural network using back-propagation of values of the one or more loss functions.

17. The method according to claim 1, further comprising, at the external encoder:
  receiving the output data from the artificial neural network; and
  encoding the image data using the encoding mode selected to generate an encoded bitstream.

18. A computing device configured to perform a method of processing image data using an artificial neural network prior to encoding using an external encoder operable in a plurality of encoding modes, comprising:
  one or more memories comprising computer-executable instructions; and
  one or more processors configured to execute the computer-executable instructions and cause the computing device to:
    receive, at the artificial neural network, the image data representing one or more images;
    process the image data using the artificial neural network to generate output data indicative of a selected encoding mode selected from the plurality of encoding modes of the external encoder, wherein:
      the artificial neural network is trained to select the selected encoding mode of the plurality of encoding modes using the image data and one or more differentiable functions configured to emulate an encoding process, the one or more differentiable functions being configured to emulate operations associated with the plurality of encoding modes of the external encoder, and
      the artificial neural network is trained independently of the external encoder; and
    output the generated output data from the artificial neural network to the external encoder to enable the external encoder to encode the image data using the selected encoding mode.

19. A non-transitory computer-readable medium comprising computer-executable instructions that, when executed by a processor of a computing device, cause the computing device to perform a method of processing, prior to encoding using an external encoder, image data using an artificial neural network, wherein the external encoder is operable in a plurality of encoding modes, the method comprising:
  receiving, at the artificial neural network, the image data representing one or more images;
  processing the image data using the artificial neural network to generate output data indicative of a selected encoding mode selected from the plurality of encoding modes of the external encoder, wherein:
    the artificial neural network is trained to select the selected encoding mode from the plurality of encoding modes using the image data and one or more differentiable functions configured to emulate an encoding process, the one or more differentiable functions being configured to emulate operations associated with the plurality of encoding modes of the external encoder, and
    the artificial neural network is trained independently of the external encoder; and
  outputting the generated output data from the artificial neural network to the external encoder to enable the external encoder to encode the image data using the selected encoding mode.

* * * * *